(12) United States Patent
Kim et al.

(10) Patent No.: US 9,434,431 B2
(45) Date of Patent: Sep. 6, 2016

(54) INTUITIVE DRIVE-BY-WIRE STEERING WITH REDUNDANT MECHANICAL CONTROL

(71) Applicants: Daniel Kee Young Kim, Vancouver, WA (US); Colin Wade, Santa Cruz, CA (US)

(72) Inventors: Daniel Kee Young Kim, Vancouver, WA (US); Colin Wade, Santa Cruz, CA (US)

(73) Assignee: Lit Motors Corporation, San Francisco, CA (US)

( * ) Notice: Subject to any disclaimer, the term of this patent is extended or adjusted under 35 U.S.C. 154(b) by 0 days.

(21) Appl. No.: 14/537,835

(22) Filed: Nov. 10, 2014

(65) Prior Publication Data

US 2015/0166099 A1    Jun. 18, 2015

Related U.S. Application Data

(60) Provisional application No. 61/902,721, filed on Nov. 11, 2013.

(51) Int. Cl.
| | |
|---|---|
| B62D 11/00 | (2006.01) |
| B62D 55/02 | (2006.01) |
| B62D 61/02 | (2006.01) |
| B62D 37/06 | (2006.01) |
| B62K 3/00 | (2006.01) |
| B62K 21/00 | (2006.01) |

(52) U.S. Cl.
CPC ............... B62D 61/02 (2013.01); B62D 37/06 (2013.01); B62K 3/007 (2013.01); B62K 21/00 (2013.01)

(58) Field of Classification Search
CPC ...... B62D 37/06; B62D 61/02; B62K 21/00; B62K 3/007

USPC ........... 701/41; 180/9.38, 9.44, 12, 222, 37, 180/280, 401, 410, 402, 419–440; 280/1.202, 5.51, 234, 240, 263, 419, 280/426, 442, 445, 773–779, 750
See application file for complete search history.

(56) References Cited

U.S. PATENT DOCUMENTS

| | | | |
|---|---|---|---|
| 6,219,604 B1 * | 4/2001 | Dilger ................... | B62D 6/003 180/422 |
| 2004/0143379 A1 | 7/2004 | Borroni-Bird et al. | |

(Continued)

FOREIGN PATENT DOCUMENTS

| | | | |
|---|---|---|---|
| RU | 2296893 | | 4/2007 |
| WO | WO2013-018548 | * | 2/2013 |

OTHER PUBLICATIONS

International Search Report and Written Opinion for International Application No. PCT/US2014/065092, mailed Jun. 4, 2015.

*Primary Examiner* — Muhammad Shafi
(74) *Attorney, Agent, or Firm* — Blakely Sokoloff Taylor & Zafman LLP (57) ABSTRACT

A drive-by-wire steering system on a vehicle requiring counter-steering includes a driver input mechanism, for example, a steering wheel, joystick, voice command receiver, or keyboard, and a control system. A sensor receives driver input and sends that information to the control system. An engagement mechanism, for example, a clutch, separates the driver input mechanism from controlling the vehicle. The control system further includes at least one actuator, a wheel, and a mechanical linkage controllable via the engagement mechanism in order for the control system to articulate a steering mechanism, for example, the front wheel of the vehicle, as appropriate.

6 Claims, 5 Drawing Sheets

(56) References Cited

U.S. PATENT DOCUMENTS

| | | |
|---|---|---|
| 2007/0144814 A1 | 6/2007 | Arnold et al. |
| 2008/0283024 A1 | 11/2008 | Gregorio |
| 2011/0071718 A1 | 3/2011 | Norris et al. |
| 2011/0231085 A1* | 9/2011 | Kim ............... B62D 37/06 701/124 |
| 2014/0019006 A1* | 1/2014 | Bruce ............ B62D 5/0457 701/41 |
| 2014/0172236 A1* | 6/2014 | Nishikawa ........ B62D 6/00 701/42 |

\* cited by examiner

INTUITIVE DRIVE-BY-WIRE STEERING WITH REDUNDANT MECHANICAL CONTROL

CROSS-REFERENCE TO RELATED APPLICATIONS

This application claims the benefit of U.S. Provisional Application No. 61/902,721, filed Nov. 11, 2013, the disclosure of which is incorporated herein by reference in its entirety.

FIELD OF THE INVENTION

Embodiments of the invention generally pertain to transportation vehicles, and more particularly to vehicle steering systems.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DESCRIPTION

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

This patent relates to the field of vehicle steering, particularly active, drive-by-wire steering systems enhanced with a mechanical redundancy for providing an intuitive user experience. Drivers primarily stabilize vehicle states during operation by changing vehicle speeds and/or counter-steering (i.e., for vehicles such as single-track systems, similar type track systems that utilize lateral stability when stationary when or at low-speeds, or vehicles that articulates a lean). Counter-steering describes the concept where the driver is to first turn opposite from the direction which driver desires to go in order to destabilize the vehicle until the necessary lean is achieved. The driver then corrects the steering toward the direction desired to guide the vehicle along the turn. Embodiments of the invention improves upon this counter-intuitive process that complicates the user experience in vehicle operation.

Embodiments of the invention describe a vehicle control system that includes at least a driver input mechanism, at least one control actuator, and one control processor/controller linked to at least two or more wheels, The above components operate to counter-steer the vehicle as needed, implement gyroscopically stabilization, or implement a combination of counter-steering and gyroscope stabilization; these operations are performed in accordance with the driver's command(s) to maintain stabilization without the need for driver to counter-steer. The control system translates user inputs (e.g., steering wheel angle and accelerator pedal angle) to motor/actuator commands; these commands may be used to simultaneously (or near simultaneously) track a yaw rate and vehicle speed and stabilize vehicle states (e.g., roll angle/rate, steer angle/rate, etc.).

The above embodiment may also comprise of a means of haptic feedback to the driver to make the driving experience more intuitive to the driver.

The haptic feedback system indicates the control effort needed to perform the requested maneuver, as well as feedback from road conditions. This is implemented as a responsive torque on the steering actuation system (steering wheel, joystick, handlebars, etc.). As a driver inputs a desired steering angle, the haptic system will resist the input proportional to the amount of control action necessary to complete said steering angle. Added to this torque will be feedback from road conditions to give the driver a sense of "road feel." Haptic feedback could be accomplished via a servo motor connected to the shaft of the steering wheel (before the mechanical clutch), and actuated by the steering control system.

As described below with reference to the figures, embodiments of the invention utilize drive-by-wire steering concepts. "Drive-by-wire" steering allows for more precise control of the vehicle; prior art solutions have never applied drive-by-wire steering concepts to solve counter-steering.

Embodiments of the invention further describe electronically controlled drive-by-wire steering concepts that are additionally supported by a mechanical fail-safe steering system. Thus, embodiments of the invention may or may not be enhanced by power/electrical components, or computer processing components (e.g., the components of a system controller illustrated in FIG. 4).

By decoupling the driver input from the steering controls, embodiments of the invention enables remote steering and allows for enhancement or override of driver inputs by supporting steering control commands sent from remote devices. Furthermore, the remote driver does not need to provide counter steering commands to remotely operate vehicles with a track system that utilizes lateral stability when stationary or when at low speeds.

Figure 1:
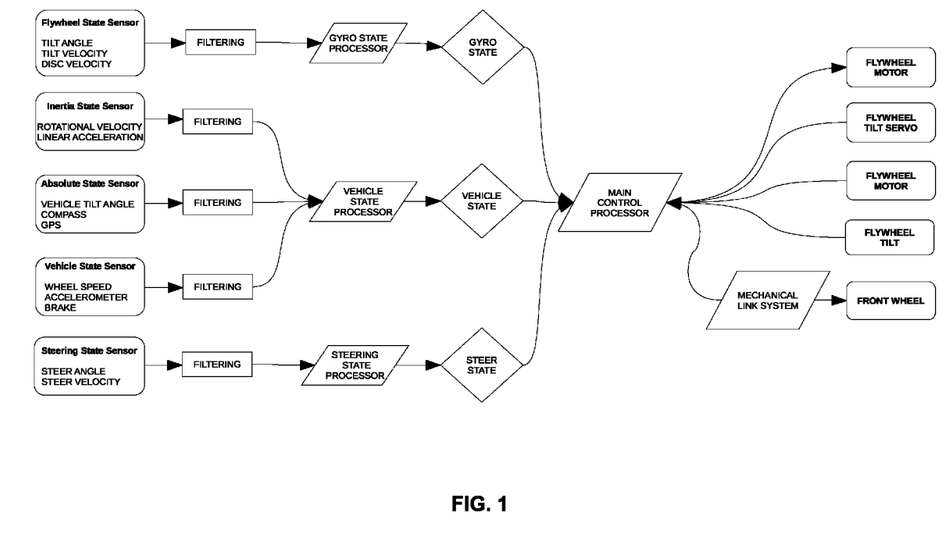

Embodiments of the invention describes methods and processes for enabling steering controls to substitutes the need for driver to counter-steer. FIG. 1 is a block diagram of some of the components that may be included in a vehicle to execute said methods and processes.

Operations of said methods and processes include receiving user inputs from a steering mechanism (e.g., a steering wheel) via a sensor e.g., to indicate the steering wheel position), receiving vehicle state information (e.g., vehicle speed, flywheel torque output, road wheel position, feedback torque sensor) via sensors; receiving external data (e.g., road traction, weather effects) via sensors.

This data and sensor information are analyzed to determine how to get the vehicle to respond according to the user's command. Command signals are generated through direct input from the driver into the input mechanism or are received from a remote command device to control at least one of steering actuators, flywheels in gyroscopic stabilization system or a combination of the two in order to actuate the direction of the vehicle directly in accordance to the user command.

With the above embodiment includes executing operations via electronic and sensor components, embodiments may also include a mechanical embodiment for redundancy. Said mechanical embodiment may include: means to reestablish, upon an electrical failure or driver command, the engagement mechanism the driver input mechanism to the road wheel and engage the mechanical gearbox employing mechanical means including any combination or mechanical equivalent of a mechanical gearbox/planetary mechanism/levers component including gears, planetary mechanism, levers components, or hydraulic pumps and piston to allow continual intuitive steering for the driver.

Figure 2:
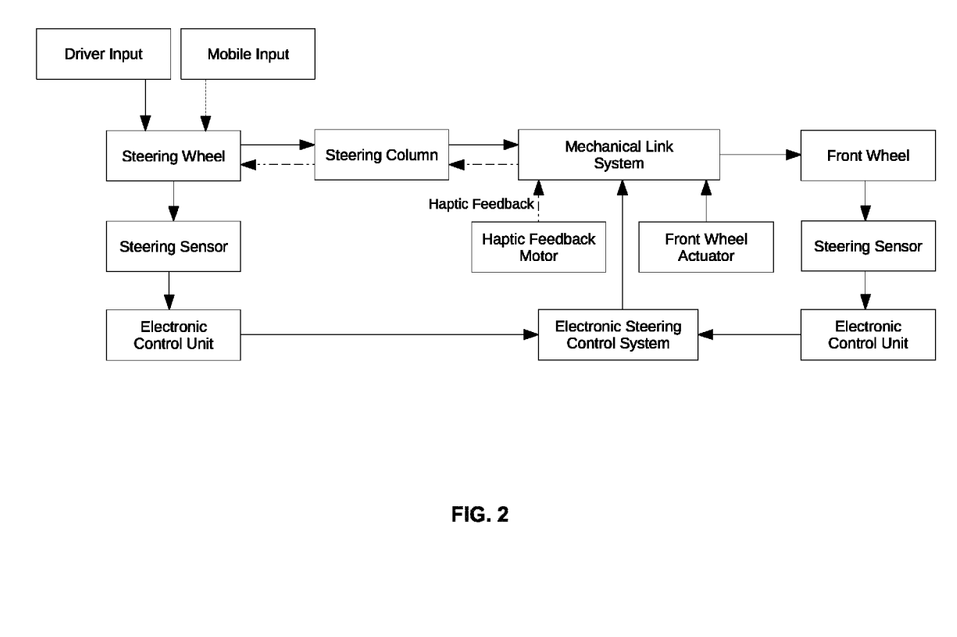
Figure 3:
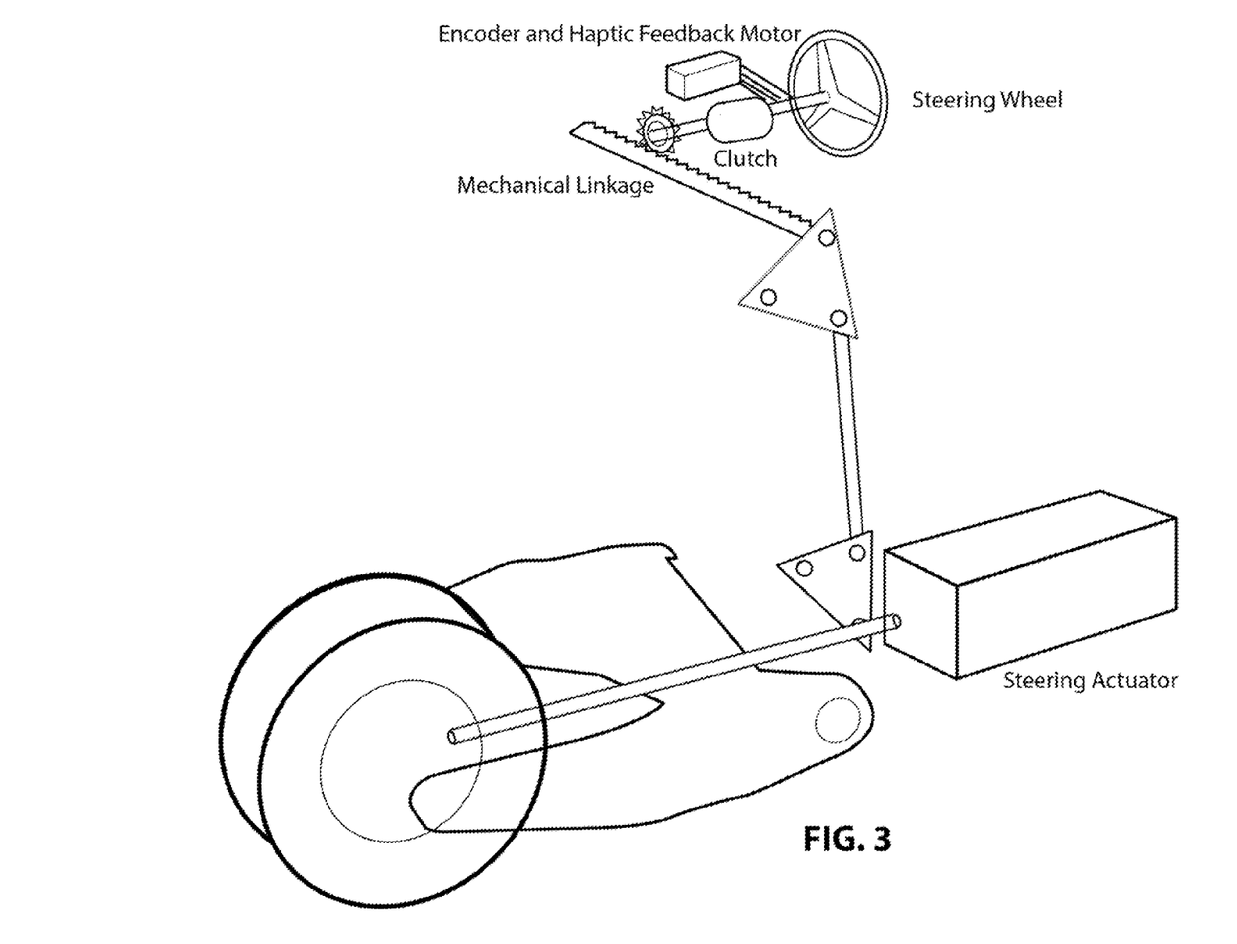

FIG. 2 is a block diagram for some components of a steering system according to an embodiment of the invention. FIG. 3 is an illustration of a steering system according to an embodiment of the invention. Said steering systems may include a driver input mechanism (e.g., a steering wheel, joystick, voice command receiver, keyboard, etc.), a sensor to receive driver input and send information to the controls system, a mechanical device to separate the driver input mechanism from vehicle control (e.g., a clutch), an electronic control system, at least one actuator and a wheel (e.g., a road wheel). The electronic control system may control the steering of the vehicle, as described herein. Furthermore, a mechanical linkage may be included that can be engaged/disengaged by employing the clutch-type mechanism in order for the electric controls system to articulate the steering mechanism (i.e. front wheel) as appropriate. In some embodiments, upon the failure of the electrical system, the clutch engages the mechanical linkage so the driver input mechanism may implement the mechanical fail-safe (described above) to continue to steer the vehicle without having to counter-steer.

Embodiments of the invention are applicable to vehicles with gyro stabilized systems (e.g., the vehicle illustrated in FIG. 5 and describes further below). Embodiments of the invention are also applicable to vehicles without a gyroscopic system.

Embodiments of the invention may describe a control system including a processor, a memory module, and a control module stored in the memory and executed via the processor. The control module may execute operations to receive data from a plurality of sensors indicating driver input, orientation of a frame of a vehicle, orientation of a front wheel of the vehicle with respect to the frame, orientations and rotational speeds of a plurality of flywheels included in a gyroscope unit coupled to the frame, and speed of the frame, determine a current vehicle state based, at least in part, on the received data, and adjust an output torque of the gyroscope unit by adjusting a rotational velocity of a tilt of at least one of the flywheels from an axis of rotation normal to an axis of rotation of the front a wheel of the vehicle based, at least in part, on the current vehicle state. This adjustment of the output torque may include, but is not limited to: increasing the rotational velocity of the tilt of the at least one of the flywheels to increase the output torque of the gyroscope unit, and minimizing the rotational velocity of the tilt in response to determining the current vehicle state to use the output torque of the gyroscope unit for a prolonged period of time.

The control module may further adjust the direction of the front wheel (e.g., via an electronic signal command) to counter-steer for the driver while the mechanical linkage from the driver input mechanism to the road wheel is disengaged (e.g., via a clutch).

Figure 4:
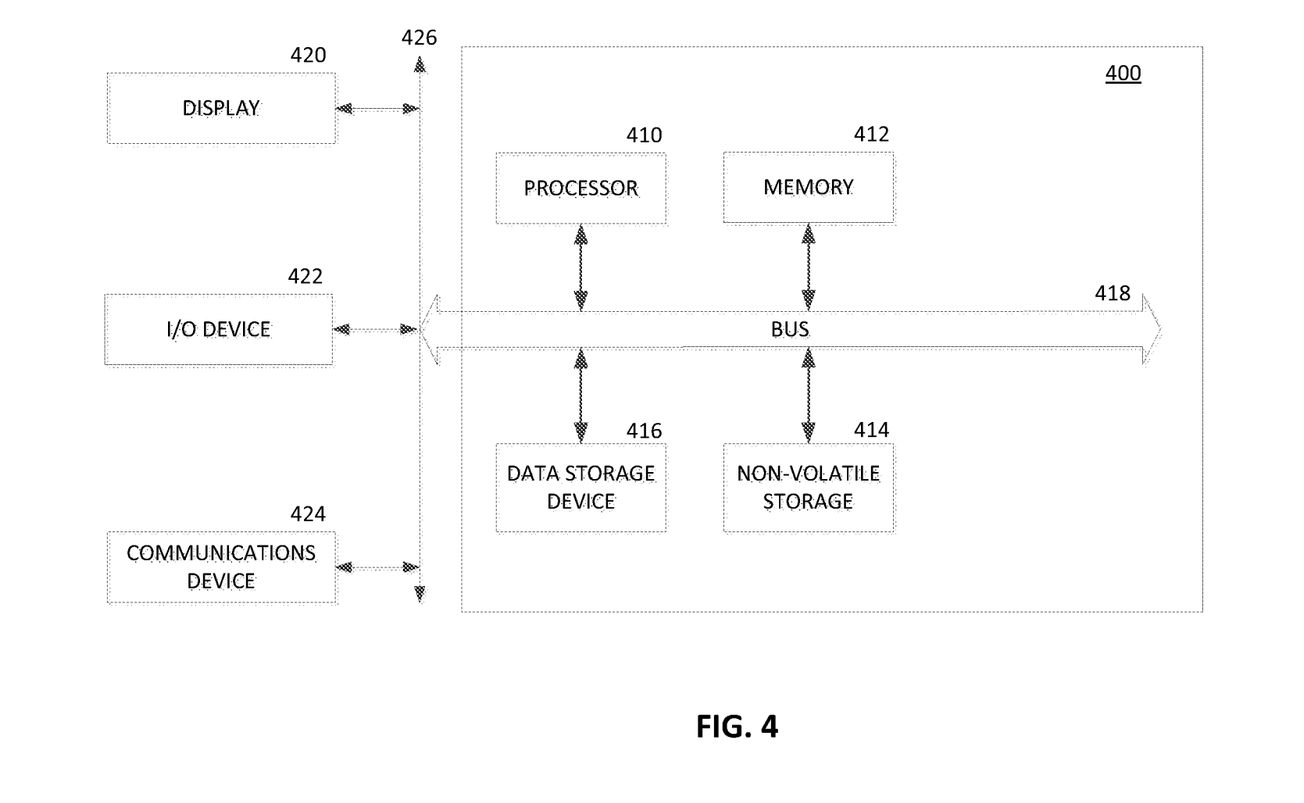

FIG. 4 is an illustration of a computing device to execute a system controller according to an embodiment of the invention. System 400 as illustrated may be any computing device to be included in a vehicle as described herein. As illustrated, system 400 includes bus communication means 418 for communicating information, and processor 410 coupled to bus 418 for processing information. The system further comprises volatile storage memory 412 (alternatively referred to herein as main memory), coupled to bus 418 for storing information and instructions to be executed by processor 410. Main memory 412 also may be used for storing temporary variables or other intermediate information during execution of instructions by processor 410. The system also comprises static storage device 416 coupled to bus 418 for storing static information and instructions for processor 410, and data storage device 414 such as a magnetic disk or optical disk and its corresponding disk drive. Data storage device 414 is coupled to bus 418 for storing information and instructions. In other embodiments, bus communication may be replaced with other communication networks.

The system may further be coupled to display device 420, such as a cathode ray tube (CRT) or a liquid crystal display (LCD) coupled to bus 418 through bus 426 for displaying information to a computer user. I/O device 422 may also be coupled to bus 418 through bus 426 for communicating information and command selections (e.g., alphanumeric data and/or cursor control information) to processor 410.

Another device, which may optionally be coupled to computer system 400, is a communication device 424 for accessing a network. Communication device 424 may include any of a number of commercially available networking peripheral devices such as those used for coupling to an Ethernet, token ring, Internet, or wide area network. Communication device 424 may further be a null-modem connection, or any other mechanism that provides connectivity between computer system 400 and other devices. Note that any or all of the components of this system illustrated in FIG. 4 and associated hardware may be used in various embodiments of the invention.

It will be appreciated by those of ordinary skill in the art that any configuration of the system may be used for various purposes according to the particular implementation. The control logic or software implementing embodiments of the invention can be stored in main memory 412, mass storage device 414, or other storage medium locally or remotely accessible to processor 410.

Communication device 424 may include hardware devices (e.g., wireless and/or wired connectors and communication hardware) and software components (e.g., drivers, protocol stacks) to enable system 400 to communicate with external devices. The device could be separate devices, such as other computing devices, wireless access points or base stations, as well as peripherals such as headsets, printers, or other devices.

Communication device 424 may be capable of multiple different types of connectivity—e.g., cellular connectivity and wireless connectivity. Cellular connectivity refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity refers to wireless connectivity that is not cellular, and can include personal area networks (such as Bluetooth), local area networks (such as WiFi), and/or wide area networks (such as WiMax), or other wireless communication.

It will be apparent to those of ordinary skill in the art that the system, method, and process described herein can be implemented as software stored in main memory 412 or read only memory 416 and executed by processor 410. This control logic or software may also be resident on an article of manufacture comprising a computer readable medium having computer readable program code embodied therein and being readable the mass storage device 414 and for causing processor 410 to operate in accordance with the methods and teachings herein.

Figure 5:
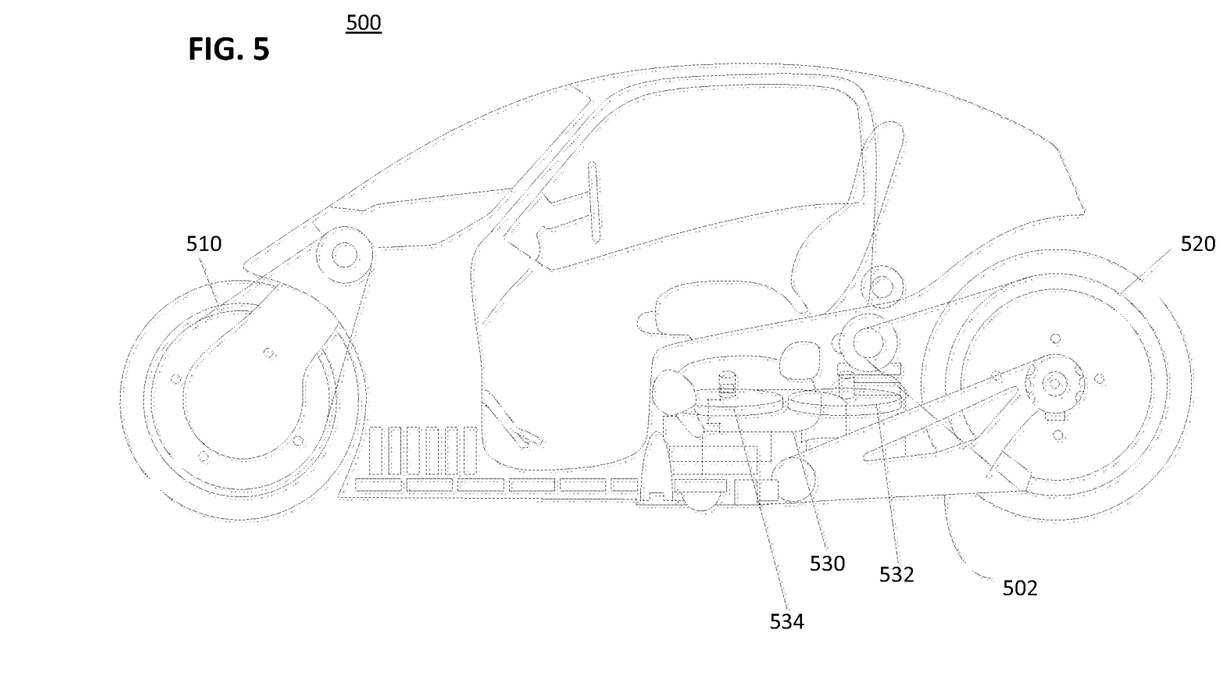

FIG. 5 illustrates an inline two-wheeled vehicle incorporating one or more embodiments of the invention. In this embodiment, vehicle 500 comprises vehicle frame 502, and further includes first and second drive wheels 510 and 520.

In this embodiment, gyro stabilizing unit 530 is coupled to vehicle 500 through vehicle frame 502. Gyro stabilizer 530 may include first and second gyro assemblies housing flywheels 532 and 534; said flywheels may differ in size and material composition, or may be substantially identical.

Gyro stabilizer 530 may be controlled such that by utilizing more than one axis of control over each gyro's flywheel, additional levels of control of the vehicle's orientation may be achieved. One controlled degree of freedom, when lined up in a mutual orthogonal axis to the vehicles roll axis and the flywheel's rotation axis, may control the vehicle's roll. An additional degree of freedom allows for control over another axis of rotation.

In some embodiments, gyro stabilizer 530 further comprises a turntable to increase the number of controllable axes of the flywheels. For example, flywheels 532 and 534 are illustrated to be coupled inline to the vehicle frame (e.g., aligned lengthwise with respect to front wheel 510 and rear wheel 520). Said turntable may change the alignment of these gyroscopes, to move their alignments towards being aligned widthwise with respect to the frame of the vehicle.

Other embodiments may comprise of mechanisms to rearrange the position of the gyro stabilizer array or adjust the alignment of the flywheels with respect to height.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing", "determining", "analyzing", "driving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The algorithms and displays presented above are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout the above specification are not necessarily all referring to the same embodiment. Furthermore, the particular features, structures, or characteristics may be combined in any suitable manner in one or more embodiments.

The present description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the various embodiments with various modifications as may be suited to the particular use contemplated.

Methods and processes, although shown in a particular sequence or order, unless otherwise specified, the order of the actions may be modified. Thus, the methods and processes described above should be understood only as examples, and may be performed in a different order, and some actions may be performed in parallel. Additionally, one or more actions may be omitted in various embodiments of the invention; thus, not all actions are required in every implementation. Other process flows are possible.

The invention claimed is:

1. A drive-by-wire steering system on a vehicle, comprising:
    a road wheel having a direction capable of adjustment a road wheel actuator coupled to the road wheel via a mechanical linkage to adjust the direction of the road wheel and thereby steer the vehicle;
    a driver input mechanism to receive driver input for steering the vehicle;
    an engagement-disengagement mechanism to mechanically couple and decouple the driver input mechanism to/from the road wheel, via the mechanical linkage, the driver input mechanism to adjust the direction of the road wheel, via the mechanical linkage, based on the driver input, when the driver input mechanism is mechanically coupled by the engagement-disengagement mechanism to the road wheel, via the mechanical linkage;
    an electronic steering control system; and
    a steering sensor to receive the driver input from the driver input mechanism and send the driver input to the electronic steering control system, the electronic steering control system to control the road wheel actuator to adjust the direction of the road wheel, based on the driver input, when the driver input mechanism is mechanically decoupled by the engagement-disengagement mechanism from the road vehicle.

2. The drive-by-wire steering system of claim 1, wherein the engagement-disengagement mechanism to mechanically couple the driver input mechanism to the road wheel upon a failure of the electronic steering control system.

3. The drive-by-wire steering system of claim 1, further comprising a haptic feedback system coupled to the driver input mechanism, the haptic system to generate torque and feedback to indicate driver effort and road conditions to a driver.

4. A method for controlling a vehicle:
    receiving user input from a steering mechanism, via a first sensor;
    receiving vehicle state data via a second sensor;
    receiving external data via a third sensor;
    receiving and analyzing at a control processor coupled to the first, second and third sensor, the user input, vehicle state data, and external data; and
    generating command signals to a steering actuator to actuate a road wheel direction of the vehicle in accordance with the user input.

5. A control system comprising:
    a processor;
    a memory module;
    a control algorithm stored in the memory module and executed via the processor to:
        receive data from a plurality of sensors indicating driver input, orientation of a frame of a vehicle, orientation of a front wheel of the vehicle with respect to the frame, orientations and rotational speeds of a plurality of flywheels included in a gyroscope unit coupled to the frame, and a speed of the vehicle;
        determine a current vehicle state based, at least in part, on the received data;
        adjust an output torque of the gyroscope unit by adjusting a rotational velocity of a tilt of at least one of the flywheels from an axis of rotation normal to an axis of rotation of the front wheel of the vehicle based, at least in part, on the current vehicle state, wherein adjusting the rotational velocity of the tilt of at least one of the flywheels comprises increasing the rotational velocity of the tilt of the at least one of the flywheels to increase the output torque of the gyroscope unit, and wherein adjusting the rotational velocity of the tilt of at least one of the flywheels comprises minimizing the rotational velocity of the tilt of the at least one of the flywheels to use the output torque of the gyroscope unit for a prolonged period of time; and
        adjust a direction of a wheel of the vehicle via electric command based, at least in part, on the current vehicle state.

6. The control algorithm of claim 5, further executed via the processor to adjust the output torque of the gyroscope unit by adjusting the rotational velocity of the tilt of at least one of the flywheels from the axis of rotation normal to the axis of rotation of the front wheel of the vehicle based, at least in part, on the current vehicle state to stabilize or steer the vehicle.

* * * * *

UNITED STATES PATENT AND TRADEMARK OFFICE
CERTIFICATE OF CORRECTION

| | | |
|---|---|---|
| PATENT NO. | : 9,434,431 B2 | Page 1 of 1 |
| APPLICATION NO. | : 14/537835 | |
| DATED | : September 6, 2016 | |
| INVENTOR(S) | : Daniel Kee Young Kim and Colin Wade | |

It is certified that error appears in the above-identified patent and that said Letters Patent is hereby corrected as shown below:

In the Claims

Column 7, Claim 1, Line 33, please delete "adjustment" insert -- adjustment; -- and start a new paragraph for "a road wheel actuator coupled to the road wheel via a mechanical linkage to adjust the direction of the road wheel and thereby steer the vehicle;"

Signed and Sealed this
Tenth Day of January, 2017

Michelle K. Lee
*Director of the United States Patent and Trademark Office*